Dec. 20, 1955  L. J. MOWRY  2,727,971
FERRULE GRIP AND FERRULE ASSEMBLY
Filed Dec. 2, 1953
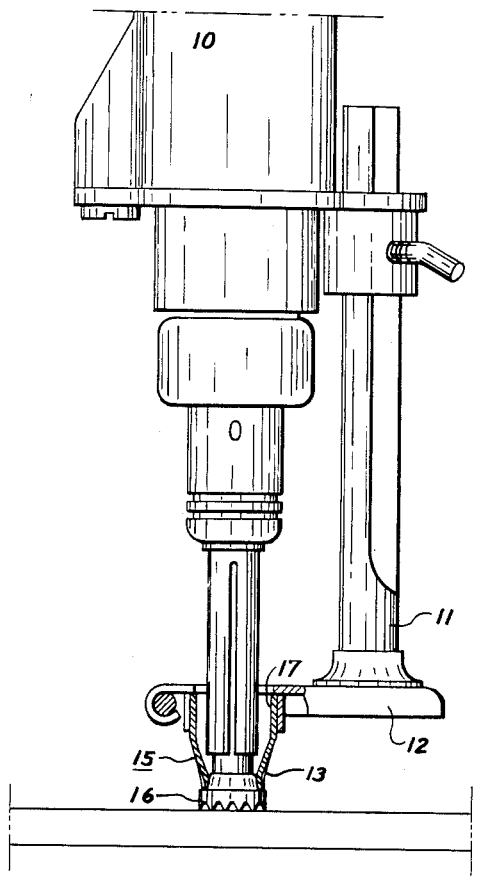
Fig. 1
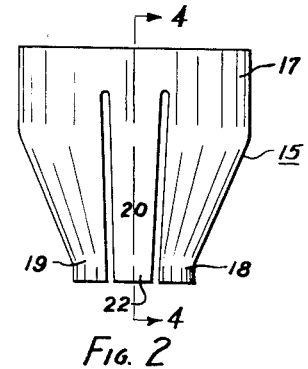
Fig. 2
Fig. 3
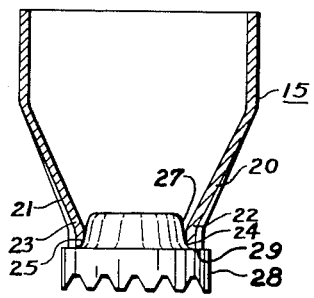
Fig. 4
INVENTOR.
L. John Mowry
BY Clyde H. Haynes
his atty.

United States Patent Office 2,727,971
Patented Dec. 20, 1955

2,727,971

FERRULE GRIP AND FERRULE ASSEMBLY

Lorenz John Mowry, Elyria, Ohio, assignor to Gregory Industries, Inc., Detroit, Mich., a corporation of Michigan Application December 2, 1953, Serial No. 395,739

8 Claims. (Cl. 219—8)

The present invention relates to the ferrule grip and ferrule assembly used during the welding of studs to plates or work pieces.

In the past ferrules have been supported during the welding operation by a ferrule grip. However, the design of the grips used did not afford long life of the ferrule grip. The ferrules themselves are expendable and a new ferrule has to be used with each weld. In stud welding there has long been a problem regarding the design of ferrules and ferrule grips so that the ferrule grip will withstand considerable abuse and at the same time hold all ferrules within manufacturing tolerances. Many various types and designs of grips and ferrules have been constructed in an attempt to reduce the mortality rate of the ferrule grips and at the same time provide a grip which will hold ferrules manufactured within both the upper and lower limits of manufacturing tolerances.

The present grip is economical to manufacture and has the necessary resilient fingers for keeping the ferrule within the ferrule grip.

One of the objects of the present invention is to provide an improved ferrule grip and ferrule assembly for use in stud welding.

Another object of the invention is to provide an improved ferrule grip in which the ferrule gripping fingers are protected from forces used to press the ferrule held thereby against the plate during the welding.

Another object of the present invention is to provide a ferrule grip constructed from a single piece in which resilient fingers for gripping the ferrule are protected by non-resilient portions.

Another object of the invention is to provide a ferrule grip and ferrule assembly in which the resilient fingers engage the shank of a ferrule and non-resilient portions abut the shoulder of the ferrule.

Further objects and a better understanding of the invention are apparent from the following description and claims when taken in conjunction with the attached drawing in which:

Figure 1 is an elevational view partly in section showing the ferrule grip holding a ferrule on a stud welding gun;

Figure 2 is a plan view of a ferrule grip;

Figure 3 is a bottom view of the ferrule grip of Figure 2; and

Figure 4 is a sectional view taken along the line 4—4 of Figure 2.

A stud welding gun 10 having a single leg 11 and a foot 12 for supporting a ferrule grip and ferrule assembly 13 is illustrated in Figure 1. The single leg 11 may be attached to a gun as disclosed in a Patent #2,416,915 issued to Evans, March 4, 1947. It is understood that the ferrule grip and ferrule assembly 13 can be used in other holding fixtures besides the one illustrated.

The ferrule grip and ferrule assembly 13 consist of a ferrule grip 15 constructed from a single piece of material and a ferrule 16. Although other materials may be used, we have found copper base materials to be very practical for the ferrule grip 15. Weld splatter formed during welding does not readily attach itself to copper based materials. The ferrule 16 is constructed from a heat resistant ceramic or clay like material.

The ferrule grip 15 consists of a somewhat conical shaped piece as illustrated in Figures 2, 3 and 4. This piece has a generally tubular shape at one end 17 which is the end used for supporting the ferrule grip. Referring to Figure 1 the end 17 extends into the foot 12 and is clamped therein. At the other end of the grip 15 are a pair of substantially semi-circular non-resilient ferrule engaging portions 18 and 19. Extending from the tubular shaped end 17 and between the non-resilient ferrule engaging portions 18 and 19 are a pair of fingers 20 and 21. These fingers 20 and 21, are integrally joined with the supporting or tubular shaped end 17 and the non-resilient portions 18 and 19 since the whole grip is constructed from a single piece of material. The fingers 20 and 21 have sufficient resilient properties so that they may be flexed inwardly toward the axis of the ferrule grip to engage a ferrule inserted therein.

In the ferrule grip illustrated, the ferrule engaging ends 22 and 23 of fingers 20 and 21 have less width than the end which is integrally joined to the tubular shaped end and the non-resilient ferrule engaging portions. The inside surface of the ferrule engaging ends are curved chamfered or otherwise contoured to reduce the area of contact between the fingers and the ferrule to a minimum. These inside surfaces of the ferrule engaging ends 22 and 23 are referred to in the drawings by the reference characters 24 and 25 respectively.

Ferrule 16 has a tapered shank 27 and a wall 28. The wall 28 and the shank 27 are coaxially aligned and integrally joined to provide a shoulder 29 around the outside circumference thereof. In the assembly as illustrated in Figure 4 the non-resilient ferrule engaging portions 18 and 19 of ferrule grip 15 abut the shoulder 29, and the curved surfaces 24 and 25 of the fingers 20 and 21 engage the shank 27. Pressure used to push the ferrule 16 against the plate or work piece 30 is applied by the non-resilient portions 18 and 19 against the shoulder 29. These non-resilient portions 18 and 19 protect the fingers 20 and 21 and prevent deforming them by pressing the ferrule against the work. The fingers 20 and 21 grip the shank 27 of the ferrule 16 sufficiently to prevent it from falling out of the grip while the ferrule is being placed against the work piece 30. Since the non-resilient portions 18 and 19 are substantially semi-circular and the fingers are small compared thereto the non-resilient portions 18 and 19 also protect the fingers if the stud welding gun is dropped.

In manufacturing ferrules from clays, wide tolerances are necessary because of the abrasive action of the clays on the ferrule forming dies. In the past it was found that a ferrule grip which would hold a ferrule constructed on an old die would not also hold a ferrule constructed on a new die unless the ferrule grip was bent or otherwise altered. In the present grip the fingers have sufficient resiliency and are sufficiently protected so that they can hold this resiliency and grip ferrules made in either new or old dies, wherein the various ferrules have different dimensions within manufacturing tolerances.

Although the preferred design of the grip is illustrated and described herein, it is understood that slight modifications may be made without departing from the spirit and scope of the invention as defined by the following claims.

What is claimed is:

1. A ferrule grip consisting of a single piece of hollow material formed into a somewhat conical shaped portion and a generally tubular shaped portion at the larger end thereof, said conical portion having substantially semi-circular non-resilient ferrule engaging portions diagonally opposing each other at the smaller end thereof, and diagonally opposing resilient fingers joined to said tubular shaped end and extending between said ferrule engaging portions and flexed inwardly to grip a ferrule inserted between said non-resilient ferrule engaging portions.

2. The subject matter of claim 1 wherein said fingers have less width at their ferrule gripping ends than at the end joining the tubular shaped portion.

3. The subject matter of claim 1 wherein said fingers have a curved surface on their ferrule gripping ends.

4. The subject matter of claim 2 wherein said fingers have a curved surface on their ferrule gripping ends.

5. An assembly for welding comprising, a welding ferrule having a wall and an integrally concentric shank on one end thereof, said shank and said wall providing an external shoulder at the end of said wall, a ferrule grip consisting of a single piece of hollow material formed into a modified cone shaped piece having substantially semi-circular non-resilient portions diagonally opposing each other and abutted against said shoulder and having diagonally opposing resilient fingers between said non-resilient portions engaging said shank, said fingers and said portions being integrally joined at a distance from said shoulder.

6. The subject matter of claim 5 wherein said fingers terminate in a curved inside surface which contacts the shank of the ferrule.

7. The subject matter of claim 5 wherein said fingers have less width at their shank engaging ends than at their end joined to the non-resilient portions.

8. The subject matter of claim 6 wherein said fingers have less width at their shank engaging ends than at their end joined to the non-resilient portions.

References Cited in the file of this patent

UNITED STATES PATENTS

| | | |
|---|---|---|
| 1,092,574 | Jansson | Apr. 7, 1914 |
| 2,416,954 | Remmer | Mar. 4, 1947 |
| 2,563,760 | Uline | Aug. 7, 1951 |